(12) United States Patent
Stanaland

(10) Patent No.: US 10,017,921 B2
(45) Date of Patent: Jul. 10, 2018

(54) WALL HYDRANT WITH INTEGRAL SHUT-OFF VALVE

(71) Applicant: Jay R. Smith Manufacturing Company, Montgomery, AL (US)

(72) Inventor: William Anthony Stanaland, Montgomery, AL (US)

(73) Assignee: Jay R. Smith Manufacturing Company, Montgomery, AL (US)

(*) Notice: Subject to any disclaimer, the term of this patent is extended or adjusted under 35 U.S.C. 154(b) by 0 days.

(21) Appl. No.: 14/544,917

(22) Filed: Mar. 6, 2015

(65) Prior Publication Data

US 2016/0258141 A1 Sep. 8, 2016

Related U.S. Application Data

(63) Continuation of application No. 13/986,195, filed on Apr. 10, 2013, now Pat. No. 8,973,599.

(51) Int. Cl.
| | | |
|---|---|---|
| *E03B 9/02* | (2006.01) | |
| *F16K 24/04* | (2006.01) | |
| *F16K 31/50* | (2006.01) | |
| *F16K 1/04* | (2006.01) | |
| *F16K 3/08* | (2006.01) | |
| *F16K 15/12* | (2006.01) | |

(52) U.S. Cl.
CPC .............. *E03B 9/025* (2013.01); *F16K 1/04* (2013.01); *F16K 3/085* (2013.01); *F16K 15/12* (2013.01); *F16K 24/04* (2013.01); *F16K 31/50* (2013.01); *Y10T 137/698* (2015.04)

(58) Field of Classification Search
CPC .... E03B 9/025; E03B 9/027; E03B 2009/022; E03B 9/00–9/20; Y10T 137/698; F16K 1/04; F16K 24/04; F16K 31/50
See application file for complete search history.

(56) References Cited

U.S. PATENT DOCUMENTS

| | | | | |
|---|---|---|---|---|
| 63,913 | A * | 4/1867 | Marks et al. ............. | E03B 9/04 |
| | | | | 137/292 |
| 181,846 | A * | 9/1876 | Hooton ..................... | E03B 9/10 |
| | | | | 137/293 |
| 190,868 | A * | 5/1877 | Jarecki ..................... | E03B 9/10 |
| | | | | 137/293 |
| 397,213 | A * | 2/1889 | Zwiebel .................... | E03B 9/04 |
| | | | | 137/291 |
| 535,063 | A * | 3/1895 | Kupperle .................. | E03B 9/20 |
| | | | | 137/292 |
| 536,801 | A * | 4/1895 | Gaghan .................... | E03C 1/042 |
| | | | | 137/295 |

(Continued)

*Primary Examiner* — Kevin Murphy
*Assistant Examiner* — Jonathan Waddy
(74) *Attorney, Agent, or Firm* — Eric J. Sosenko; Jonathan P. O'Brien; Honigman Miller Schwartz and Cohn LLP

(57) ABSTRACT

An embodiment wall hydrant includes a reservoir, conduits containing an operating rod assembly and a service rod assembly, and a fluid outlet with a hose connector. The service rod assembly allows water supply to the hydrant to be shut-off from the front of the hydrant which allows servicing of the hydrant without requiring water shut-off to all or a portion of the water supply to the building. Embodiments include a vacuum relief dual check valve assembly at the fluid outlet which prevents backflow of water into the hydrant. Embodiments include a box which protects the hydrant controls.

18 Claims, 4 Drawing Sheets

(56) References Cited

U.S. PATENT DOCUMENTS

| | | | | | |
|---|---|---|---|---|---|
| 618,753 | A | * | 1/1899 | Ward et al. | E03B 9/10 137/293 |
| 1,216,167 | A | * | 2/1917 | Riebsame | E03B 9/04 137/283 |
| 1,501,799 | A | * | 7/1924 | Neumeyer | E03B 9/14 137/292 |
| 2,580,197 | A | * | 12/1951 | Schmid | E03B 9/14 137/292 |
| 2,580,199 | A | * | 12/1951 | Schmid | E03B 9/14 137/112 |
| 2,605,781 | A | * | 8/1952 | Schmid | E03B 9/14 137/282 |
| 2,676,607 | A | * | 4/1954 | Carr | E03B 7/14 137/292 |
| 4,109,671 | A | * | 8/1978 | Hughes | E03B 9/14 137/282 |
| 4,178,956 | A | * | 12/1979 | Fillman | E03B 9/02 137/302 |
| 4,286,616 | A | * | 9/1981 | Botnick | E03B 9/02 137/215 |
| 4,538,637 | A | * | 9/1985 | Williams | E03B 7/12 137/360 |
| 4,612,954 | A | * | 9/1986 | Lissau | E03D 3/02 137/360 |
| 5,228,471 | A | * | 7/1993 | Hoeptner, III | E03B 9/025 137/218 |
| 5,355,907 | A | * | 10/1994 | Hoeptner, III | E03B 9/025 137/218 |
| 5,392,805 | A | * | 2/1995 | Chrysler | E03B 9/025 137/218 |
| 5,603,347 | A | * | 2/1997 | Eaton | E03B 9/025 137/360 |
| 5,964,246 | A | * | 10/1999 | Meeker | E03B 7/12 137/360 |
| 6,109,293 | A | * | 8/2000 | Walrath | E03B 9/02 137/360 |
| 6,206,039 | B1 | * | 3/2001 | Shuler | E03B 7/12 137/360 |
| 6,752,167 | B1 | * | 6/2004 | Stanaland | E03B 7/10 137/218 |
| 6,761,183 | B1 | * | 7/2004 | Hoeptner, III | E03C 1/106 137/218 |
| 6,857,446 | B1 | * | 2/2005 | Hoeptner, III | E03B 9/025 137/218 |
| 6,935,358 | B1 | * | 8/2005 | Hoeptner, III | E03B 9/025 137/218 |
| 7,478,645 | B2 | * | 1/2009 | Brady | E03B 7/12 137/270 |
| 2006/0090794 | A1 | * | 5/2006 | Shafik | E03C 1/02 137/360 |
| 2011/0186145 | A1 | * | 8/2011 | Cantrell | E03B 9/02 137/281 |
| 2014/0305516 | A1 | * | 10/2014 | Stanaland | E03B 9/027 137/300 |
| 2015/0000767 | A1 | * | 1/2015 | Ball | E03B 9/025 137/382 |

* cited by examiner

WALL HYDRANT WITH INTEGRAL SHUT-OFF VALVE

This application is a continuation of prior application Ser. No. 13/986,195, filed Apr. 10, 2013, now U.S. Pat. No. 8,973,599, issued Mar. 10, 2015.

BACKGROUND OF THE INVENTION

Field of the Invention

This invention relates to hydrants with a valve provided in the liquid flow path which operates in conjunction with an air vent valve.

The disclosures of U.S. Pat. No. 6,752,167 are incorporated herein by reference.

Wall hydrants are commonly installed in outside walls and allow access to the water supply inside the building for outside purposes, such as watering a lawn or garden, etc. Such hydrants customarily are protected against unauthorized or vandal use by requiring keys for access, especially for hydrants in commercial buildings. Interruption of water supply for the maintenance of such hydrants raises substantial problems. It is often impractical to provide cut-off valves in the pipe leading to an individual hydrant because of a finished room wall on the interior side of the hydrant, and because of uncertainties in relating the location of a wall hydrant to an interior room. Installation of a cut-off valve at the site of the wall hydrant risks the chance of freeze damage to the cut-off valve. As a consequence, shutting off the water to a wall hydrant customarily involves interruption of the water supply to a large portion or all of the building. Embodiments of the present application are wall hydrants with integrated freeze-protected shut-off valves.

It is crucially important that a potable water system not be contaminated. A common source of such contamination is water hoses connected to wall hydrants which provide potable water. The water supply within a building normally consists solely of potable water. This water supply also normally is used to provide water for use outside the building through a wall hydrant. Such water is used for watering a lawn, garden, washing a car, etc. using a hose attached to the wall hydrant.

A threat to the integrity of the potable water supply inside a building is created when a hose is connected to a wall hydrant, the hose is used, and the water supply is turned off at the wall hydrant. Non-potable water from the attached hose presents a potential threat to the potable supply on the other side of the hydrant. Pressure from the water in the hose may flow back through the hydrant into the water supply. In addition, a lowering of pressure inside the building may create a back-siphonage condition which causes non-potable water from the hose to enter the potable water system within the building. Finally, freezing of the hydrant may damage the valve in the hydrant and allow backflow from the hose into the potable water system inside the building.

None of the discovered prior art hydrants have the advantages of embodiments of the present application, that of having an integrated freeze-protected individual hydrant shut-off valve, of being a freeze protected hydrant, with dual independent check valves with an atmospheric vent.

The foregoing examples of the related art and limitations related therewith are intended to be illustrative and not exclusive. Other limitations of the related art will become apparent to those of skill in the art upon a reading of the specification and a study of the drawings.

BRIEF SUMMARY OF THE INVENTION

The following embodiments and aspects thereof are described and illustrated in conjunction with systems, tool and methods which are meant to be exemplary and illustrative, not limiting in scope. In various embodiments, one or more of the above-described problems have been reduced or eliminated, while other embodiments are directed to other improvements.

Embodiments include a wall hydrant which comprises a reservoir with a fluid inlet, a fluid outlet and a service port. A service valve casing having a first and a second end, is connected at the second end to the reservoir at the reservoir service port. A service valve assembly is retained within the service valve casing, the service valve assembly comprises a service valve operator, a service valve rod, and a service valve plunger, The service valve plunger is inserted into the reservoir service port, the service valve plunger is capable of interaction with and closing the reservoir fluid inlet. An operating valve conduit has a first and a second end, the second end of the conduit is in fluid communication with the reservoir fluid outlet, and an operating valve assembly is retained within the operating valve casing. The operating valve assembly comprises an operating valve operator, an operating valve rod, and an actuator cartridge assembly with the actuator cartridge assembly located adjacent to the reservoir fluid outlet. A hydrant body is connected to the first end of the service valve casing and the hydrant body is also connected to and in fluid communication with the first end of the operating valve conduit.

The hydrant body has a wall plate which supports the hydrant fluid outlet, the service valve operator and the operating valve operator.

In addition to the exemplary aspects and embodiments described above, further aspects and embodiments will become apparent by reference to the drawings and by study of the following descriptions.

BRIEF DESCRIPTION OF THE SEVERAL VIEWS OF THE DRAWING(S).

DETAILED DESCRIPTION OF THE INVENTION

Figure 1:
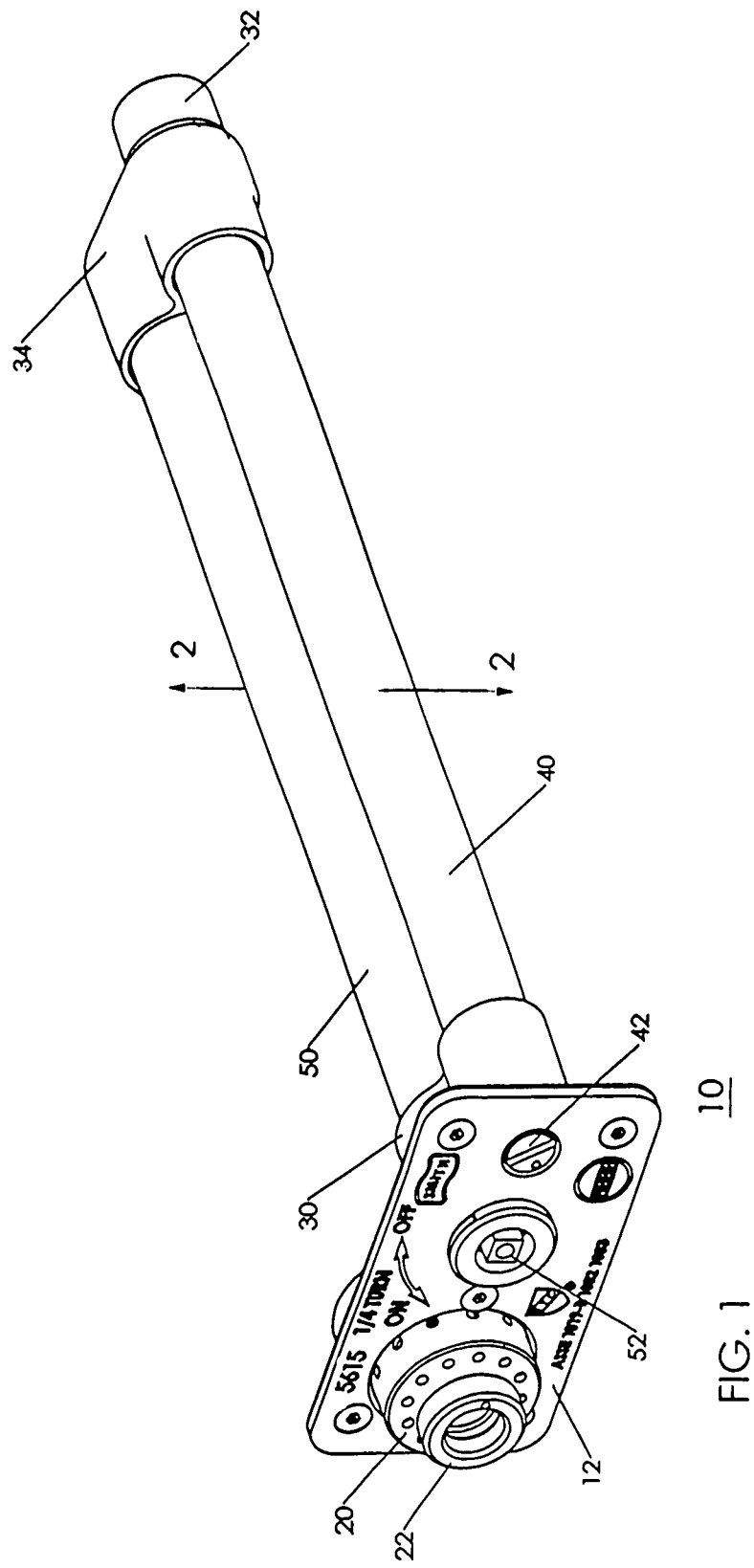
FIG. 1 is a perspective view of an embodiment wall hydrant.

FIG. 1 is a perspective view of an embodiment wall hydrant 10. Visible in FIG. 1 are the wall plate 12, vacuum relief check valve assembly 20, hydrant fluid outlet 22, hydrant body 30, operating valve conduit 50, service valve casing 40, reservoir 34, and fluid inlet port 32. In embodiments, the length of the conduits and associated assemblies varies accordingly to the thickness of the wall involved, and in embodiments the distance from the wall plate 12 to the reservoir 34 is from 4 to 25 inches. In embodiments, the wall hydrant is installed with the wall plate 12 flush with an external wall and the reservoir 34 extending from the interior side of the wall.

Figure 2:
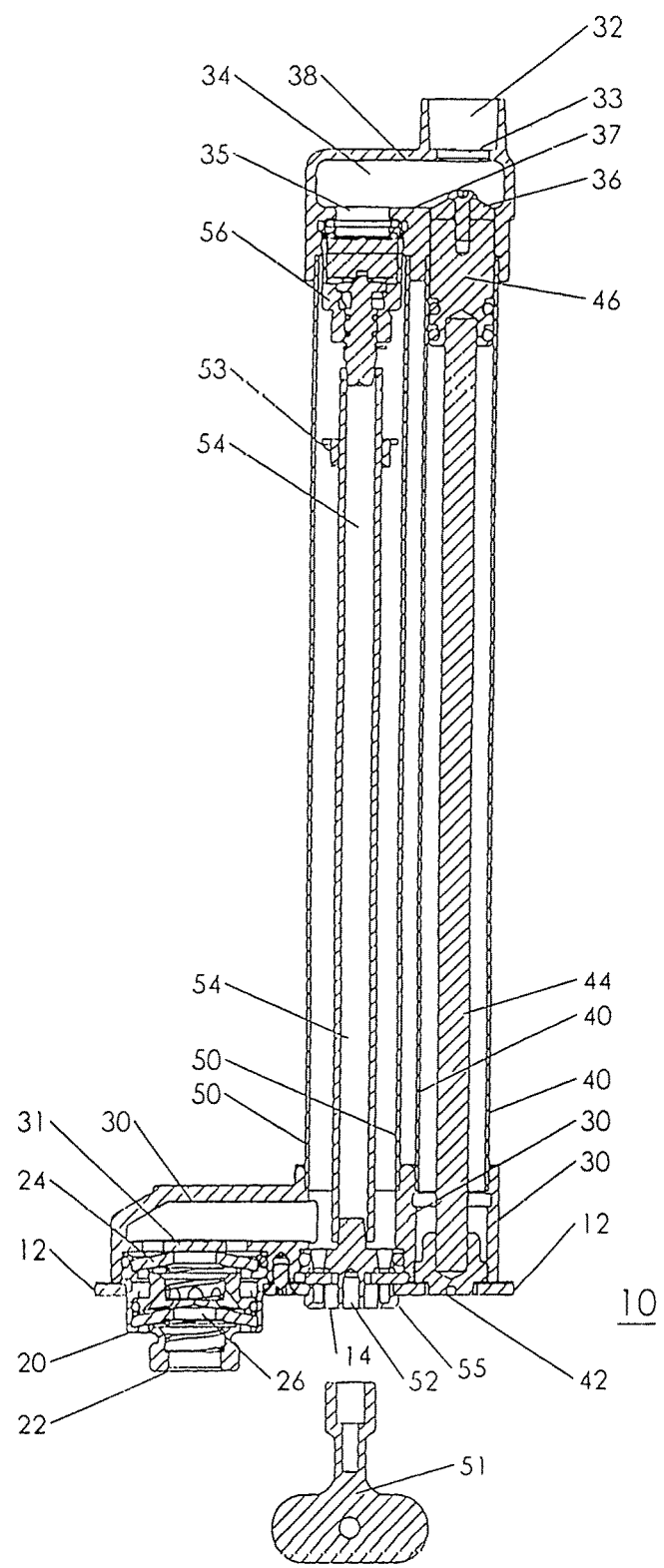
FIG. 2 is a cross-section view of an embodiment wall hydrant taken at arrow 2.

FIG. 2 is a cross-section view of an embodiment wall hydrant 10 taken at arrow 2. Visible in FIG. 2 is the hydrant body 30 with an attached wall plate 12 with a body outlet port 31. Attached to the wall plate 12 is a vacuum relief check valve assembly 20 with an inner cone washer 24, an outer cone washer 26, and a hydrant fluid outlet 22. (For additional details on the vacuum relief check valve assembly see FIG. 5).

Also attached to hydrant body 30 is an operating valve conduit 50, a tube which contains an operating valve assembly 53 with a first and a second end comprising an operating valve rod 54 with an operating valve operator 52 at the first end and an actuating valve actuator cartridge assembly 56 at the second end. (For additional details on the actuating valve actuator see FIG. 4). The operating valve operator 52 has an operating valve operator flange 55 with holes 14 which align with holes (not shown in FIG. 2) in the body wall 12 when the operating valve operator 52 is in the closed position. Although FIG. 2 shows the operating valve operator 52 as interacting with a key 51, other embodiments with an operating knob are specifically contemplated.

A tubular service valve casing 40 is mounted on the hydrant body 30 parallel to the operating valve conduit 50. Contained in the service valve casing 40 is a service valve assembly 41 with a first and a second end comprising a service rod operator 42 at the first end, a service valve rod 44, and a service valve plunger 46 at the second end. (For additional details on the service rod assembly see FIG. 3).

A reservoir 34 is located at the second ends of the operating valve assembly 53 and the service valve assembly 41. The reservoir 34 has a reservoir front wall 38 with a fluid inlet port 32 with a fluid inlet port seat 33 located on the reservoir front wall 38. A reservoir back wall 37 has a reservoir outlet port 35 in fluid communication with the operating valve conduit 50. Flow from the reservoir 34 into the operating valve conduit 50 is controlled by the actuator cartridge assembly 56. The reservoir back wall 37 also has a reservoir service port 36 which is located opposite from the fluid inlet port 32. The service valve plunger 46 interacts with the fluid inlet port seat 33 and closes the fluid inlet port 32 when the service valve plunger 46 is advanced through the reservoir. The service valve plunger 46 seals the reservoir service port 36 and prevents flow of fluid into the service rod casing 40.

Figure 3:
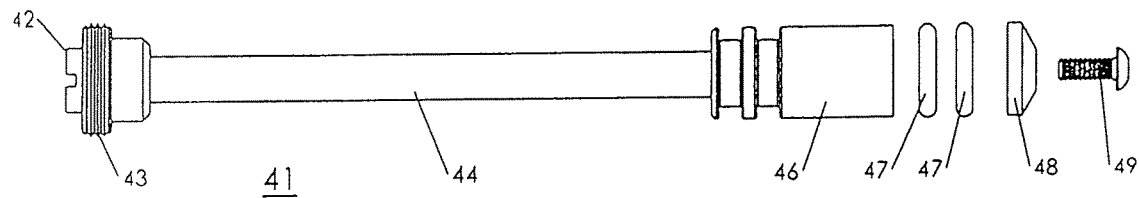
FIG. 3 is a side view of an embodiment service valve assembly.

FIG. 3 is a side view of an embodiment service valve assembly 41. Visible in FIG. 3 is the service valve operator 42, the threads 43 which interact with threads on the hydrant body (not visible in FIG. 3), service valve rod 44, service valve plunger 46, service valve O-rings 47, service valve conical washer 48 and service valve washer screw 49.

Figure 4:
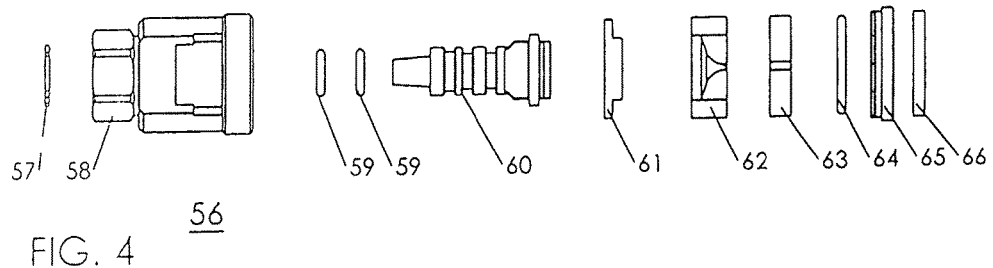
FIG. 4 is a side view of an embodiment actuator cartridge valve assembly.

FIG. 4 is a side view of an embodiment actuator cartridge valve assembly 56. Visible in FIG. 4 is a retaining ring 57, valve body 58, two adjacent actuator O-rings 59, valve actuator 60, nylon thrust washer 61, rotating ceramic disc 62, fixed ceramic disc 63, O-ring 64, O-ring gasket retainer 65, and rubber seal 66.

Figure 5:
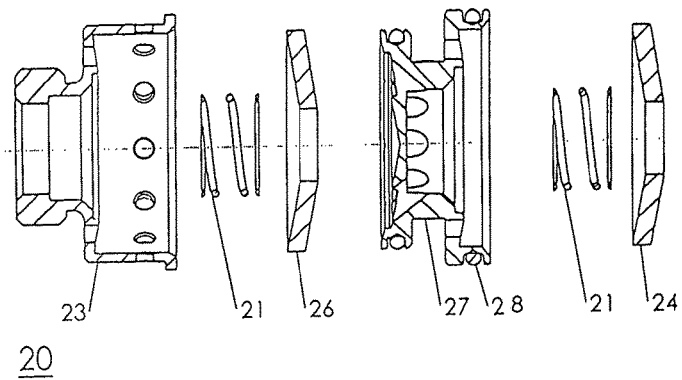
FIG. 5 is a cross-section view of an embodiment vacuum relief check valve assembly.

FIG. 5 is a cross-section exploded view of an embodiment vacuum relief check valve assembly 20. Visible in FIG. 5 is vacuum relief housing 23 with attached hydrant fluid outlet 22, spring 21, outer cone washer 26, flow diverter 27, large O-ring 28, spring 21, and inner cone washer 24. Springs 21 are located between the vacuum relief housing 23 and outer cone washer 26, and large O-ring 28 and inner cone washer 24.

Figure 6:
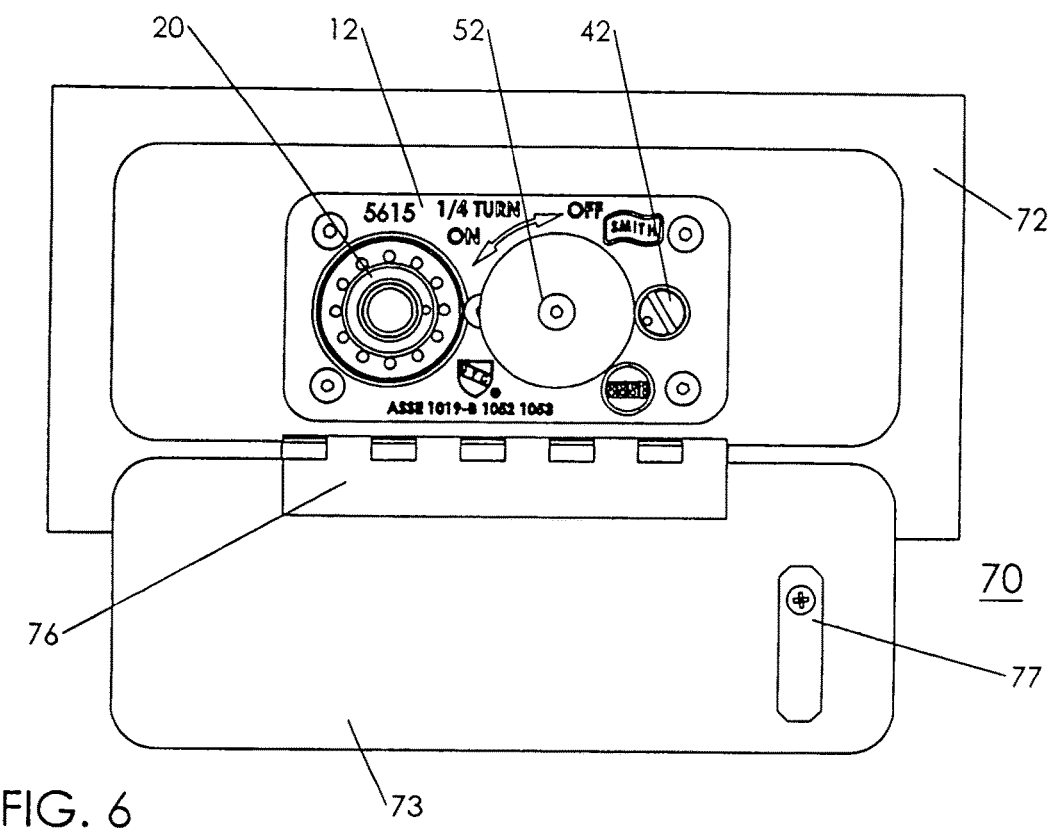
FIG. 6 is a front view of an embodiment wall hydrant installed inside a hydrant box.

FIG. 6 is a front view of an embodiment wall hydrant installed inside a hydrant box 70 with the door open. Visible in FIG. 6 is the frame 72, inner surface of the cover 73, hinge 76, and inner view of the latch 77. Also visible in the hydrant wall plate 12, vacuum relief check valve assembly 20, operating valve operator 52, and service valve operator 42. In embodiments the service rod operator 42 is a slot which interacts with a screwdriver. Other means for turning the service rod operator, such as a key hole for a key, are specifically contemplated.

Figure 7:
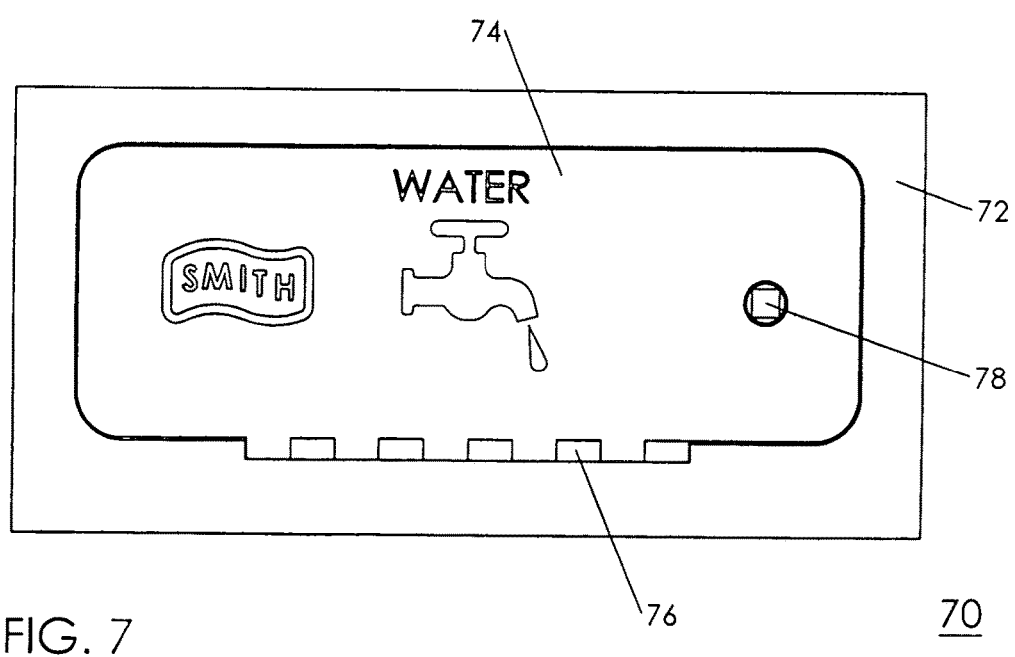
FIG. 7 is a front view of an embodiment hydrant box with the door closed.

FIG. 7 is a front view of an embodiment hydrant box with the door closed. Visible in FIG. 7 is a stainless steel box 70 including a frame 72, outer surface of the cover 74, the hinge 76, and the outer view of the latch 78.

Unless otherwise indicated, embodiments are manufactured of suitable hard, non-porous, strong materials such as bronze, steel, stainless steel, and iron.

In embodiments, when it is desired to shut off the flow of fluid to the wall hydrant for maintenance or any other purpose, a screwdriver is used to rotate clockwise the service rod operator 42 which advances the plunger 46 into the reservoir 34 through the reservoir service port 36 until the fluid inlet port seat 33 (all above in FIG. 2) interacts with and is sealed by the service valve conical washer (48 in FIG. 3). After maintenance is performed on the wall hydrant as desired, the service rod operator 42 is rotated counterclockwise, thereby opening the fluid inlet port 32 (in FIG. 2) and restoring water to the wall hydrant.

In embodiments, flow through the wall hydrant is initiated by rotating counterclockwise the operating valve operator 52 with an operating valve key 51 or a knob, as shown in FIGS. 2 and 6. In embodiments ¼ turn rotation is sufficient to fully open the valve. The operating valve rod 54 is rotated counterclockwise causing rotation of a rotating ceramic disc 62, causing the alignment of openings in the rotating ceramic disc 62 and the fixed ceramic disc 63. Potable water flows from the reservoir outlet port 35 into the operating valve conduit 50 and into the hydrant body 30. Water flows through the body outlet port 31 and enters the vacuum relief check valve assembly 20. Water pressure overcomes the bias of the spring 21 and opens the inner cone washer, allowing passage of water through the flow diverter 27 and then the water pressure overcomes the spring 21 which biases the outer cone washer in the closed position, thereby allowing flow of water through the vacuum relief housing 23 and into the hydrant fluid outlet 22, which in embodiments is a threaded hose connector. Flow from the hydrant is stopped by rotating the operating valve operator 52 in the clockwise direction which turns the rotating ceramic disc 62 so its holes are not aligned with holes in the fixed ceramic disc 63. In addition, rotation of the operating valve operator 52 into the closed position also causes alignment of holes in the operating valve operator 52 with holes in the wall plate 12, allowing water to drain from the operating valve conduit 50 and from the hydrant body 30, thereby providing freeze protection for the wall hydrant. Freeze protection for water in the reservoir is provided by the building heating system.

Although the present disclosure discusses only water as a fluid, the use of embodiments with other fluids, such as ethanol, other organic solvents, oil, petroleum products, air and other gases, is specifically contemplated.

The vacuum relief check valve assembly 20 provides two independent check valves, the inner cone washer 24, and the outer cone washer 26, each of which prevents the backflow of water from an attached hose into the hydrant body. In addition, atmospheric vents located between the two check valves in the vacuum relief housing act as a vacuum relief to further reduce the likelihood of backflow.

While a number of exemplary aspects and embodiments have been discussed above, those of skill in the art will recognize certain modifications, permutations, additions and sub combinations thereof. It is therefore intended that the following appended claims and claims hereafter introduced are interpreted to include all such modifications, permutations, additions and sub-combinations as are within their true spirit and scope. The applicant or applicants have attempted to disclose all the embodiments of the invention that could be reasonably foreseen. There may be unforeseeable insubstantial modifications that remain as equivalents.

I claim:

1. A wall hydrant comprising:
a fluid inlet,
a reservoir adjacent to the inlet and receiving fluid from the inlet,
a non-passively actuable service valve for interrupting the flow of fluid from the fluid inlet to the reservoir, the service valve being retained within a service casing,
a fluid outlet,
a non-passively actuable operating valve for controlling the flow of fluid from the reservoir to the fluid outlet, the operating valve being manually operable and being retained within an operating conduit, the service casing being separate from and parallel to the operating conduit, and
a hydrant body configured to be mounted to a wall of a building, the operating conduit and service casing being connected to the hydrant body with the operating conduit fluidly connecting the reservoir to the hydrant body, the hydrant body at least partially defining the flow path for the fluid from the operating conduit to the fluid outlet.

2. The wall hydrant of claim 1, further comprising a vacuum relief check valve assembly adjacent to the fluid outlet.

3. The hydrant of claim 2 wherein the vacuum relief check valve assembly comprises two independent check valves and at least one atmospheric vent located between the check valves.

4. The wall hydrant of claim 1 wherein the fluid is selected from the group consisting of water, ethanol, other organic solvents, oil, petroleum products, air and other gases.

5. The wall hydrant of claim 1 wherein a material of manufacture is selected from the group consisting of bronze, steel, stainless steel, and iron.

6. The wall hydrant of claim 1 further comprising a hydrant box.

7. The wall hydrant of claim 6 wherein the hydrant box further comprises a hinged cover.

8. The wall hydrant of claim 1, wherein the service valve is manually operable.

9. The wall hydrant of claim 1, wherein the operating valve is configured to selectively control the flow of fluid from the fluid inlet to the fluid outlet.

10. The wall hydrant of claim 1, wherein the operating valve includes an operating valve operator configured to move the operating valve between open and closed positions of the operating valve.

11. The wall hydrant of claim 10, wherein the operating valve operator is manually actuable and extends exteriorly of the operating conduit.

12. The wall hydrant of claim 1, wherein the service valve includes a service valve operator configured to move the service valve between open and closed positions of the service valve, the service valve operator extending exteriorly of service casing and being manually actuable.

13. The wall hydrant of claim 1, wherein the service valve operator is configured to be manually actuable by a screwdriver.

14. The wall hydrant of claim 1, wherein the operating valve includes an operating valve operator configured to move the operating valve between open and closed positions of the operating valve, the operating valve operator extending exteriorly of the operating conduit and being manually actuable, the service valve including a service valve operator configured to move the service valve between open and closed positions of the service valve, the service valve operator extending exteriorly of service casing and being manually actuable.

15. A wall hydrant for a wall of a building, the wall hydrant comprising:
a reservoir including a fluid inlet and a reservoir outlet;
a hydrant body including portions defining a fluid pathway coupled to a fluid outlet for discharging fluid from the wall hydrant;
a service casing having a first end attached to the reservoir and a second end attached to the hydrant body, a service valve assembly extending through the service casing and including a service valve moveable between open and closed positions, in the closed position the service valve preventing the flow of fluid into the reservoir from the fluid inlet, the service valve assembly including a manually actuable service valve operator being accessible exteriorly of the hydrant body; and
an operating conduit having a first end attached to the reservoir and a second end attached to the hydrant body, the operating conduit at least partially defining a flow path for the fluid from the reservoir outlet into the hydrant body, an operating valve assembly extending through the operating conduit and including an operating valve moveable between open and closed positions, in the closed position the operating valve preventing the flow of fluid from the reservoir outlet to the hydrant body, the operating valve assembly including a manually actuable operating valve operator being accessible exteriorly of the hydrant body.

16. The wall hydrant according to claim 15, wherein the fluid outlet, operating valve assembly and service valve assembly are oriented along parallel axes.

17. The wall hydrant according to claim 15, wherein the fluid outlet, operating valve operator and service valve operator are located adjacent one another along the hydrant body.

18. The wall hydrant according to claim 15, wherein the fluid outlet, operating valve operator and service valve operator located in a row along the hydrant body.

* * * * *